United States Patent [19]

Reynolds

[11] 4,392,694
[45] Jul. 12, 1983

[54] CENTER BEARING BRACKET
[75] Inventor: James T. Reynolds, Toledo, Ohio
[73] Assignee: Dana Corporation, Toledo, Ohio
[21] Appl. No.: 318,358
[22] Filed: Nov. 5, 1981

Related U.S. Application Data

[63] Continuation of Ser. No. 17,402, Mar. 5, 1979, abandoned.

[51] Int. Cl.³ .............................................. F16C 27/06
[52] U.S. Cl. .............................. 308/184 R; 308/187.1
[58] Field of Search ............... 308/184 R, 184 A, 179, 308/167, 237 R, 187.1, 187.2; 384/202, 203, 215, 220, 221, 222

[56] References Cited

U.S. PATENT DOCUMENTS 2,572,411 10/1951 Watt .
2,897,023 7/1959 Burkhalter et al. .................. 308/184
2,906,572 9/1959 Wroby ............................. 308/184 R
2,933,354 4/1960 Primeau ............................... 308/184
3,306,679 2/1967 Stokely .
3,309,154 3/1967 Stokely .............................. 308/184
3,639,015 2/1972 Maas .

Primary Examiner—Lenard A. Footland
Attorney, Agent, or Firm—Emch, Schaffer & Schaub Co.

[57] ABSTRACT

An improved bearing assembly is disclosed for supporting a split drive shaft of a vehicle. An inner, rotatable race of a bearing engages the drive shaft and an outer, non-rotatable race of the bearing is mounted in a resilient rubber block. The rubber block, which is connected through a bracket to the vehicle frame, permits limited radial and axial movement of the bearing. The bracket has a flange spaced from the rubber block to the rear of the bearing which limits axial movement of the bearing to prevent the drive shaft from pulling the bearing from the rubber block.

7 Claims, 5 Drawing Figures

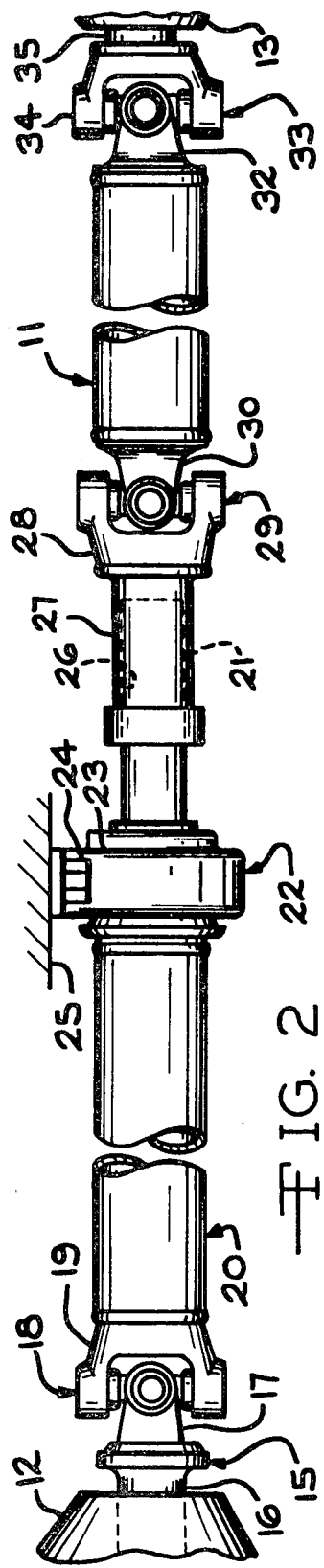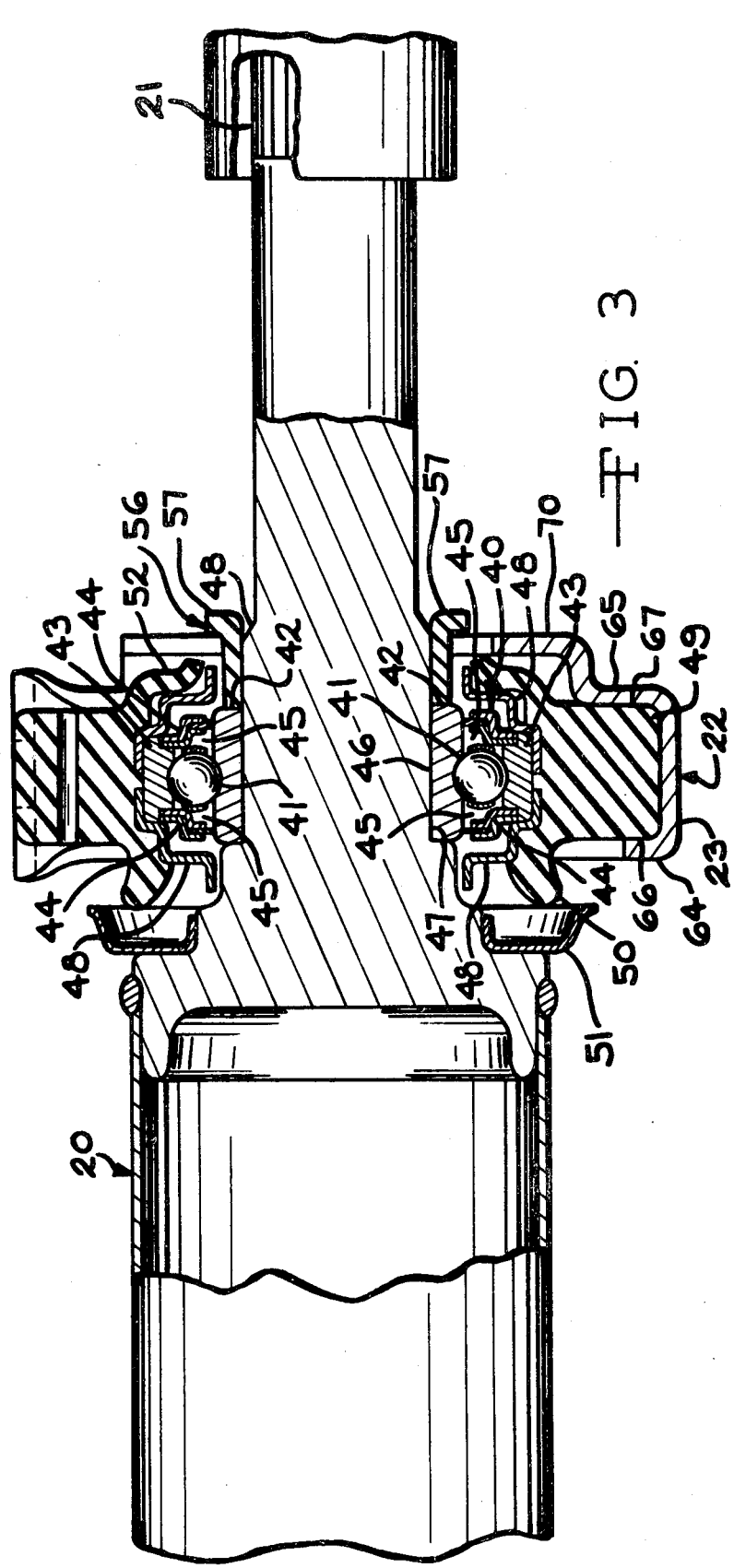

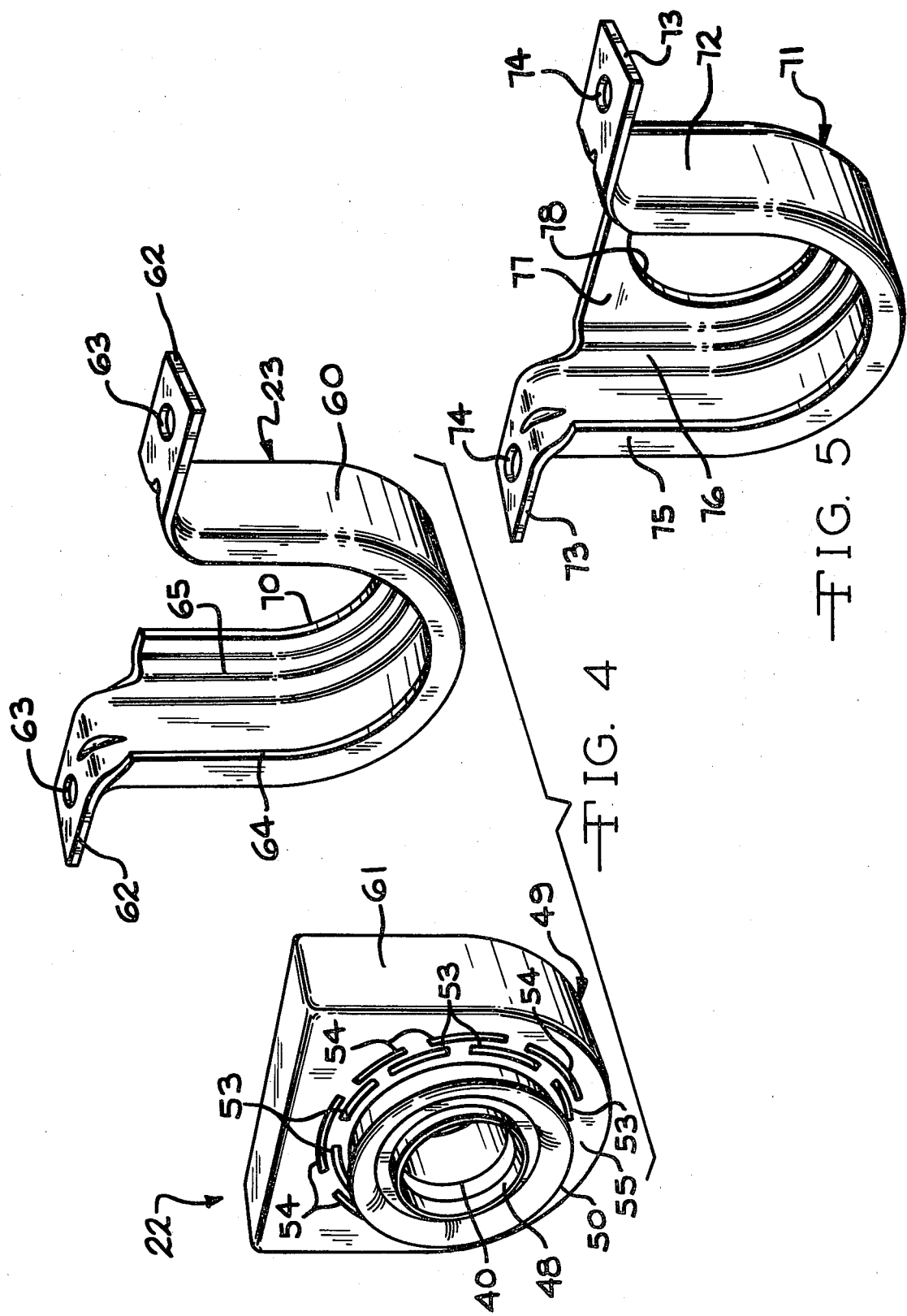

CENTER BEARING BRACKET

This application is a continuation of application Ser. No. 17,402, filed Mar. 5, 1979, abandoned.

This invention relates to bearings and more particularly to an improved resiliently mounted center bearing for supporting a split drive shaft of a vehicle.

In vehicles such as automobiles and trucks, a front mounted engine is generally coupled through a drive shaft, a differential gear and rear axles to drive the rear wheels of the vehicle. Depending upon several factors including the distance between the transmission and the differential gear and the angular misalignment between the output of the transmission and the input to the differential gear, the drive shaft may be a single piece or it may be in the form of a split shaft having two or more shaft sections with adjacent sections coupled together through a universal joint. For example, the output from the vehicle transmission may be coupled through a universal joint to a coupling shaft which is in turn coupled through a second universal joint to a drive shaft which is coupled through a third universal joint to the differential gear. One or more slip joints are provided in the drive shaft with, typically, one slip joint between the coupling shaft and the transmission and a second slip joint between the coupling shaft and drive shaft. The slip joints permit variations in the spacing between the transmission and the differential gear due to manufacturing tolerances and also permit limited changes in the spacing when the differential gear moves with the rear suspension system for the vehicle. In order to provide stability for the system, it is necessary to support the coupling shaft adjacent the second universal joint. The rotating shaft is engaged with a bearing which is embedded in a resilient rubber bushing which in turn is attached through a bracket to the vehicle chassis, frame or body.

In a vehicle drive as the type described above, one problem occurs when the slip joint adjacent to the second universal joint is prevented from slipping. This could be caused by a lack of lubricant or by contaminants in the slip joint. This in turn forces axial movement to take place at the slip joint between the coupling shaft and the transmission. When this occurs, the axial movement of the coupling shaft sometimes pulls either the bearing from its resilient rubber bushing or pulls the rubber bushing from the bracket or housing which connects the bushing to the vehicle frame. Due to vehicle geometry, the axial movement of the coupling shaft is generally to the rear of the vehicle.

Various attempts have been made in the past to eliminate this condition. U.S. Pat. No. 3,306,679, for example, shows a resilient mounting for a center bearing on a vehicle drive shaft which is designed to withstand considerable axial movement before failure. In another variation of the resilient mounting for a center bearing shown in U.S. Pat. No. 3,309,154, the resilient mounting is permitted to roll axially a considerable distance to either side of its supporting frame prior to failure. Although the prior art has attempted to solve this potential center bearing problem for a vehicle coupling shaft, there is still an incidence of this occuring.

According to the present invention, an improved center bearing assembly is provided for supporting a split drive shaft which connects a vehicle transmission to a differential gear. The center bearing assembly also may be used in coupling shafts for other applications and is particularly suitable for applications wherein the coupling shaft may be subject to limited axial forces which tend to pull a supporting bearing from its mounting.

According to the present invention, an inner, rotatable race of a bearing engages the coupling shaft and an outer, non-rotatable race of the bearing is mounted in a resilient rubber block or bushing. The rubber block, which is connected through a bracket to the vehicle frame, chassis or other rigid member, permits limited radial and axial movement of the bearing. The bracket has a flange which is normally spaced from the rubber block to the rear of the bearing. When the coupling shaft attempts to move in a rearward direction by a distance greater than the spacing, axial movement of the coupling shaft is restrained by the rubber block engaging the flange. This prevents axial movement of the coupling shaft from pulling the bearing from the rubber block or from pulling the rubber block from the mounting bracket. Since the rubber block does not normally engage the flange, noise and vibrations from the vehicle drive train normally are not transmitted through the rubber block and the flange on the mounting bracket to the vehicle.

Accordingly, it is an object of the invention to provide an improved center bearing assembly for supporting a split drive shaft in a vehicle.

Another object of the invention is to provide an improved center bearing assembly for supporting a split drive shaft in a vehicle which includes means for preventing the bearing from separating from its mounting due to axial movement of the drive shaft.

Other objects and advantages of the invention will become apparent from the following detailed description, with reference being made to the accompanying drawings.

FIG. 2 is a side elevational view of a split drive shaft in a vehicle supported by the center bearing assembly of the present invention;

FIG. 3 is an enlarged fragmentary cross sectional side elevational view of the center bearing assembly of the present invention;

FIG. 4 is a perspective view showing the center bearing assembly of the present invention with the rubber block separated from its mounting bracket; and FIG. 5 is a perspective view of a modified embodiment of the mounting bracket for the rubber block of the center bearing assembly of the present invention.

Figure 1:
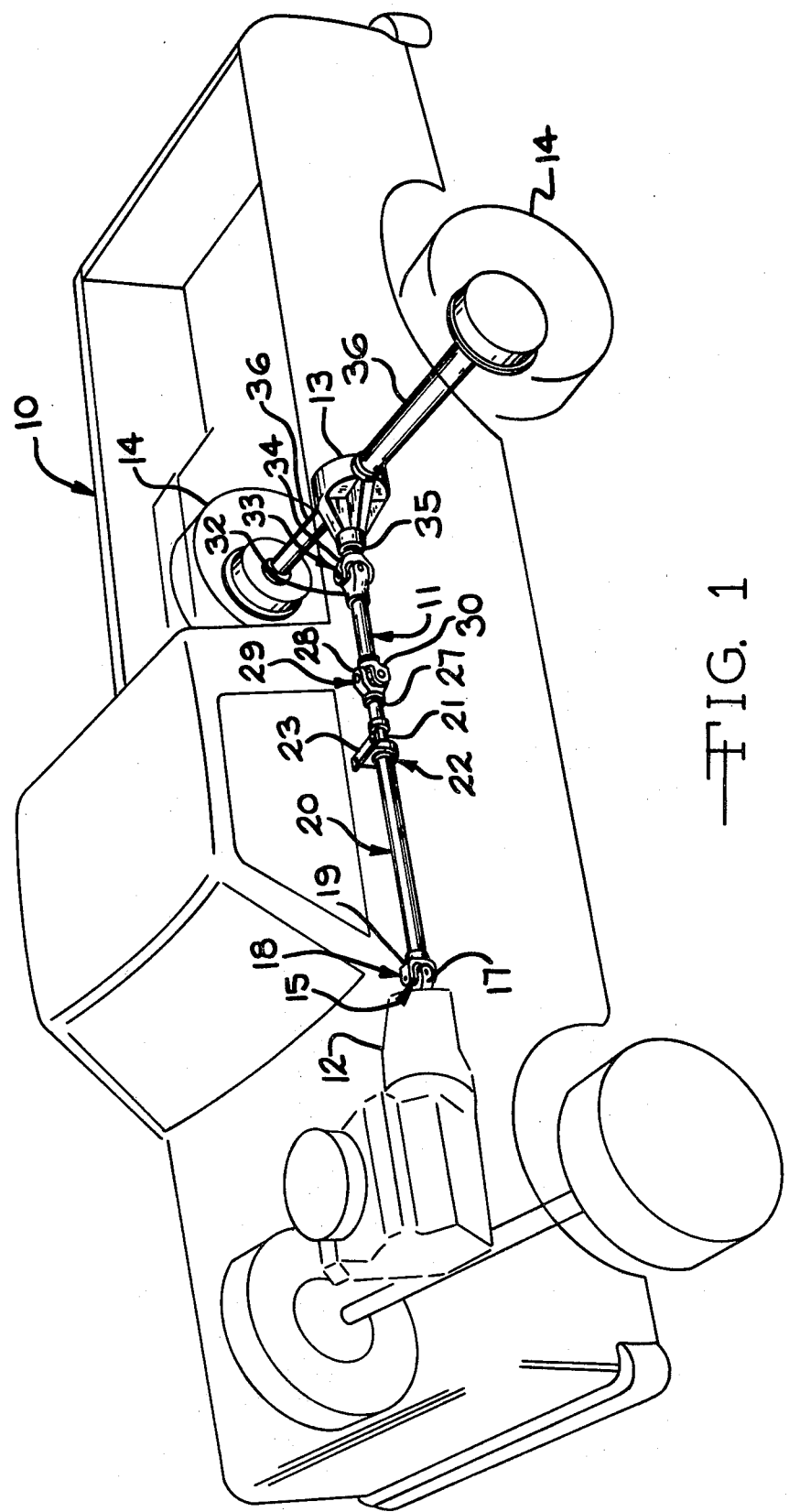
FIG. 1 is a perspective illustration of a vehicle showing the location and use of the center bearing assembly of the present invention for supporting a split drive shaft.

Turning now to the drawings and particularly to FIGS. 1 and 2, a vehicle 10 is illustrated in FIG. 1 which includes a coupling shaft 20 and a drive shaft 11 connected between a transmission 12 and a differential gear 13 for driving a pair of rear wheels 14. The transmission 12 is provided with an output shaft (not shown) of conventional design and having a plurality of splines formed around its periphery and extending in a direction parallel with its axis. A slip yoke 15 has an internally splined tubular end portion 16 which slidably engages the transmission output shaft and is rotated by such output shaft. The slip yoke 15 also has a yoke end 17 which forms one side of a universal joint 18. The other side of the universal joint 18 is formed by a yoke 19. The coupling shaft 20 has an opposite end terminating in a splined shaft portion 21. A center bearing assembly 22 in accordance with the present invention supports the coupling shaft 20 adjacent the splined shaft portion 21. The center bearing assembly 22 includes a rigid frame or bracket 23 which is rigidly attached with bolts to a vehicle frame, chassis or body 25.

The splined shaft portion 21 at the end of the coupling shaft 20 is received by an internally splined end portion 26 of a slip yoke 27 on the drive shaft 11. The splined shaft portion 21 and the splined end portion 26 move in an axial direction with respect to one another while rotating together. The slip yoke 27 has a yoke end 28 which forms a portion of a universal joint 29. A yoke 30 on drive shaft 11 forms a second portion of the universal joint 29. The drive shaft 11 has a second end terminating at a yoke 32 which forms a portion of a universal joint 33. A yoke 34 on a shaft 35 forms a second portion of the universal joint 33. The shaft 35 is connected to the differential gear 13 which is driveably connected through rear axle 36 to the rear wheels 14 of the vehicle 10.

During normal operation of the vehicle 10, the coupling shaft 20 rotates and is not subjected to substantial axial forces. As the differential gear 13 moves with the suspension system for the rear wheels 14, forward and rearward movement of the coupling shaft 20 takes place at the splined joint between the splined shaft portion 21 of the coupling shaft 20 and the internally splined portion 26 of the slip yoke 27 on the drive shaft 11. However, due to lack of lubricant or excessive contamination, this joint may eventually bind up or freeze and no longer function in its intended manner. When this happens, there is a tendency for the coupling shaft 20 to move in an axial direction and for slip to take place at the splined joint between the slip yoke 15 and the output from the transmission 12. The center bearing assembly 22 of the present invention is designed to withstand the stronger axial forces on the coupling shaft 20 and, thereby, to cause slip to occur at the joint between the splined shaft portion 21 of the coupling shaft 20 and the internally splined end portion 26 of the slip yoke 27.

Turning now to FIGS. 3 and 4, details are shown for the center bearing assembly 22 of the present invention. The center bearing assembly 22 includes a conventional bearing 40 having a plurality of balls 41 disposed between an inner, rotatable race 42 and an outer, non-rotatable race 43. The bearing 40 may be of any conventional design and includes seals 44 for holding a lubricant within a chamber 45 surrounding the balls 41. The inner bearing race 42 defines an interior opening 46 which engages a portion 47 of the coupling shaft 20 adjacent the splined shaft portion 21. Annular dirt shields 48 are positioned on either side of the outer bearing race 43. The dirt shields 48 are slightly spaced from the seals 44 and extend concentric with and nearly to the coupling shaft 20 for protecting the bearing 40 from dirt and other road contaminants.

The dirt shields 48 and the outer race 43 are embedded within a resilient rubber member or bushing 49 which in turn either is mounted within the bracket 23 or is molded directly in the bracket 23 so as to bond the rubber member 49 to the bracket 23. A forward edge of the rubber member 49 defines a lip 50 which extends into an annular region defined by a shield 51 mounted on the coupling shaft 20 for further reducing the possibility of road contaminants reaching the bearing 40. A lip 52 formed at a rear face of the rubber member 49 is folded inwardly over the rear one of the dirt shields 48. An additional shield in the form of a slinger 56 is mounted on the shaft portion 47 to the rear of the bearing 40. The slinger 56 has a flange 57 which projects radially from the coupling shaft 20 to the rear of the bracket 23. The slinger 56 prevents water, mud, dirt and the like from flowing along the end of the coupling shaft 20 into the center bearing assembly 22.

The rubber member or bushing 49 is shown as having two circular rows of arcuate slots spaced coaxially about the bearing 40 and arranged in an inner row 53 and an outer row 54. Preferably, the rows of slots 53 and 54 are staggered, except at a bottom region 55 of the rubber member 49, wherein no slots are present. The slots 53 and 54 permit a limited degree of radial movement of the bearing 40 within the rubber member 49 against a low resilient force. When the coupling shaft 20 applies a force to the bearing member 40 to move the bearing member 40 radially a distance greater than the thickness of the slots 53 or 54, the rubber member 49 is compressed and exerts a greater resilient force opposing such movement of the bearing 40. The slots 53 and 54 are omitted from the bottom region 55 of the rubber member 49 since the weight of the coupling shaft 20 and the drive shaft 11 are normally supported by this portion of the rubber member 49.

The rubber member or bushing 49 is supported within the bracket 23 which is in turn molded or otherwise attached to the vehicle frame, chassis or body 25. The bracket 23 is stamped from a single sheet of steel and includes a U-shaped outer region 60 which conforms with an outer surface 61 of the rubber member 49. Each end of the U-shaped region 60 is terminated by an outwardly directed flange 62 which is provided with an opening 63 which receives the bolt 24 for attaching the bracket 23 to the vehicle frame, chassis or body 25. An inwardly directed lip 64 is provided at the front of the bracket 23 to extend around the U-shaped outer region 60 and a similar inwardly directed lip 65 is provided at the rear of the bracket 23 to extend around the surface 60. The lips 64 and 65 engage forward and rear sides 66 and 67, respectively, of the rubber member 49 adjacent the outer surface 61 for retaining the rubber member 49 within the bracket 23.

In accordance with the present invention, a rear flange 70 is formed to extend radially inwardly from the rear lip 65 on the bracket 23. The rear flange 70 is located so as to maintain a predetermined small spacing from the rear lip 52 of the rubber member 49. The spacing is sufficiently large that under normal operation of the vehicle 10, the rear lip 52 on the rubber bushing or member 49 does not contact and transmit drive train vibrations to the rear flange 70 on the bracket 23. The spacing between the lip 52 and the flange 70 may, for example, be on the order of from 0.06 inch to 0.2 inch or more, depending upon the permissible axial movement of the coupling shaft 20. In any event, this spacing is maintained sufficiently small as to prevent rearward axial movement of the coupling shaft 20 from pulling the bearing 40 from the rubber member 49 or from pulling the rubber member 49 from its bracket 23. In the event that the slip joint formed between the slip yoke 27 and the splined shaft portion 21 of the coupling shaft 20 becomes contaminated and tends to bind, the coupling shaft 20 will tend to move in a rearwardly direction as the rear wheels 14, the differential gear 13 and the rear suspension for the vehicle 10 move due to road irregularities. In this event, the lip 52 on the rubber member 49 will contact the flange 70 and limit axial movement of the coupling shaft 20. This in turn will tend to force axial slip to occur at the joint between the slip yoke 27 and the splined shaft portion 21, thereby freeing up this joint and preventing this joint from freezing up entirely. This momentary contact of the rubber lip 52 with the flange 70 on the bracket or frame 23 should not be felt by occupants in the vehicle because the suspension system for the vehicle 10 is also moving at this time. This differs from prior art center bearing assemblies in which a major portion of the rubber member is in permanent contact with a mounting bracket in order to retain the bearing. Center bearing assemblies of this type transmit significant vibrations from the vehicle drive train to the vehicle frame.

Turning now to FIG. 5, a modified bracket 71 is shown for attaching the previously described rubber member or bushing 49 and the bearing 40 mounted therein to a vehicle frame, chassis or body, such as is illustrated by the reference number 25 in FIG. 2. The bracket 71 is stamped from a single sheet of metal to define an outer U-shaped region 72 which is shaped to engage the outer surface 61 of the rubber member 49. The ends of the U-shaped region 72 terminate at outwardly flared flanges 73. Holes or openings 74 are provided in the flanges 73 for attaching the bracket 71 to the vehicle with bolts, rivets, or other suitable means. A forward lip 75 is folded inwardly from the front of the U-shaped region 72 and a rear lip 76 is folded inwardly from the rear of the U-shaped region 72 to define a channel for receiving the rubber member 49. The forward lip 75 engages the forward side 66 and the rear lip 76 engages the rear side 67 of the rubber member 49 for retaining such member in the bracket 71. A flat flange surface 77 defining an opening 78 is connected to and spaced to the rear of the rear lip 76. The opening 78 is located concentric with the opening 46 in the bearing race 42 so as to pass the splined shaft portion 21 of coupling shaft 20. When the rubber member or bushing 49 is mounted within the bracket 71, the rear lip 52 on the rubber member 49 is spaced a slight distance from the flat flange 77. During normal operation of the vehicle in which the center bearing assembly is mounted, the rubber lip 52 does not contact the flange 77. In the event that the slip joint formed between the slip yoke 27 and the splined shaft portion 21 of the coupling shaft 20 becomes contaminated and tends to bind, the coupling shaft 20 will tend to move in a rearwardly direction as the rear wheels 14, the differential gear 13 and the rear suspension for the vehicle 10 move due to road irregularities. In this event, the lip 52 on the rubber member 49 will contact the flange 77 and limit axial movement of the coupling shaft 20. This in turn will tend to force axial slip to occur at the joint between the slip yoke 27 and the splined shaft portion 21, thereby freeing up this joint and preventing this joint from freezing up entirely.

Vehicle geometry normally causes the bearing in prior art center bearing assemblies to separate from its resilient mounting in a direction to the rear of the vehicle in which it is mounted. However, if the vehicle geometry is changed such that the bearing and resilient bushing or the resilient bushing and the rigid mounting bracket tend to separate in a forward direction, the bearing assembly of the present invention can be oriented in a reverse direction to prevent such separation. If the center bearing assembly is subjected to axial forces in both directions, then the mounting bracket can be provided with flanges spaced both to the front and to the rear of the rubber bushing to limit axial movement of the drive shaft in both directions. Various other changes and modifications may be made in the above-described preferred embodiment of the invention without departing from the spirit and scope of the following claims. For example, other known configurations for rubber bushing or member 49 may be used in the center bearing assembly of the present invention. The rubber bushing 49 may be bonded to the bracket 23 by molding the bushing 49 into the bracket 23 or the bushing 49 may be a separate element which slides into the bracket 49.

The embodiments of the invention in which an exclusive property or privilege is claimed are defined as follows:

1. A center bearing assembly for resiliently supporting from a rigid support a driven shaft which may be subjected to radial forces and to axial forces in at least one predetermined direction comprising a bearing having a rotatable inner race engaging said shaft, a non-rotatable outer race and a plurality of bearing elements between said inner and outer races, a resilient bushing mounting said outer race, said bushing having first and second sides and an outer edge, a bracket engaging at least a portion of said outer edge and having integral lips engaging said sides adjacent said outer edge, said integral lips retaining said bushing in said bracket, means for mounting said bracket on said rigid support, said bracket further having a flange positioned from said bushing side a predetermined small spacing, said bushing side being unrestrained adjacent said flange, whereby during normal operation said bushing side is spaced from said flange and drive train vibrations are not transmitted to said flange and whereby upon axial movement of such shaft, said bushing side is free to move through such spacing and against said flange to limit axial movement of such shaft.

2. The center bearing assembly of claim 1, wherein said flange on said bracket is spaced from and completely surrounds said outer bearing race in said predetermined direction.

3. The center bearing assembly of claim 1, wherein said resilient bushing outer edge is bonded to said bracket.

4. The center bearing assembly of claim 1, wherein said predetermined small spacing is between 0.06 inch and 0.2 inch.

5. A center bearing assembly for resiliently supporting from a rigid support a driven shaft which may be subjected to radial forces and to axial forces in at least one predetermined direction comprising a bearing having a rotatable inner race engaging said shaft, a non-rotatably outer race and a plurality of bearing elements between said inner and outer races; a resilient bushing mounting said outer race, said bushing having first and second sides and an outer edge, a bracket engaging at least a portion of said outer edge and having integral lips engaging said side adjacent said outer edge, said integral lips retaining said bushing in said bracket, means for mounting said bracket on said rigid support, said bracket further having a flange on the side of said bushing of said predetermined direction, said flange having a predetermined small spacing from said bushing, said spacing limiting axial movement of said bearing in said predetermined direction; two dirt shields mounted between said outer bearing race and said bushing, each dirt shield having a generally radially inwardly directed flange shielding a different side of said bearing with one of said shields extending between said bearing and said flange on said bracket, and wherein said bushing has a lip extending over said one shield and forming one side of said predetermined small spacing between said bushing and said flange on said bracket.

6. The center bearing assembly of claim 5, wherein said flange on said bracket is spaced from and completely surrounds said outer bearing race in said predetermined direction.

7. The center bearing assembly of claim 5, wherein said resilient bushing outer edge is bonded to said bracket.

* * * * *